«12» United States Patent
Aoki et al.

(10) Patent No.: US 9,256,308 B2
(45) Date of Patent: Feb. 9, 2016

(54) INFORMATION PROCESSING APPARATUS AND METHOD OF MANUFACTURING INFORMATION PROCESSING APPARATUS

(71) Applicant: Sony Corporation, Tokyo (JP)

(72) Inventors: Kengo Aoki, Nagano (JP); Shuichi Tatemori, Nagano (JP); Nobuyuki Shigeno, Nagano (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 13/901,147

(22) Filed: May 23, 2013

(65) Prior Publication Data
US 2013/0321311 A1    Dec. 5, 2013

(30) Foreign Application Priority Data

Jun. 1, 2012  (JP) .................................. 2012-126594

(51) Int. Cl.
*G06F 3/041* (2006.01)
*G06F 3/044* (2006.01)

(52) U.S. Cl.
CPC ............... *G06F 3/041* (2013.01); *G06F 3/044* (2013.01); *G06F 2203/04103* (2013.01); *Y10T 29/49105* (2015.01)

(58) Field of Classification Search
CPC ....... G06F 1/1626; G06F 3/044; G06F 3/041; G06F 2203/04103
USPC .............................................. 345/173; 216/13
See application file for complete search history.

(56) References Cited

U.S. PATENT DOCUMENTS

| 8,866,759 B2* | 10/2014 | Furusawa ............. G06F 1/1626 345/173 |
| 2010/0033443 A1* | 2/2010 | Hashimoto ........... G06F 3/0418 345/173 |
| 2013/0175154 A1* | 7/2013 | Takahashi ............... G06F 3/044 200/600 |

FOREIGN PATENT DOCUMENTS

JP    2008-176191 A    7/2008

* cited by examiner

*Primary Examiner* — Aneeta Yodichkas
*Assistant Examiner* — Chineyere Wills-Burns
(74) *Attorney, Agent, or Firm* — Hazuki International, LLC

(57) ABSTRACT

There is provided an information processing apparatus, including: a display unit including a display area, the display area being configured to display an image; and a touchscreen unit including a facing area and an outer area, the facing area facing the display area, the outer area being outside of the facing area. An area of the touchscreen unit is attached to the display unit, the area including the facing area and the outer area.

7 Claims, 7 Drawing Sheets

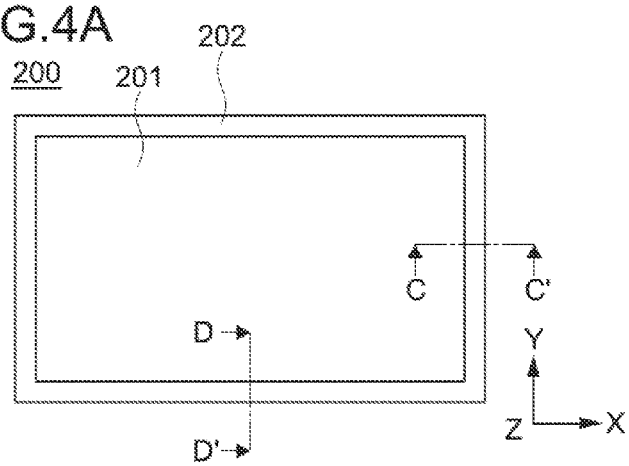
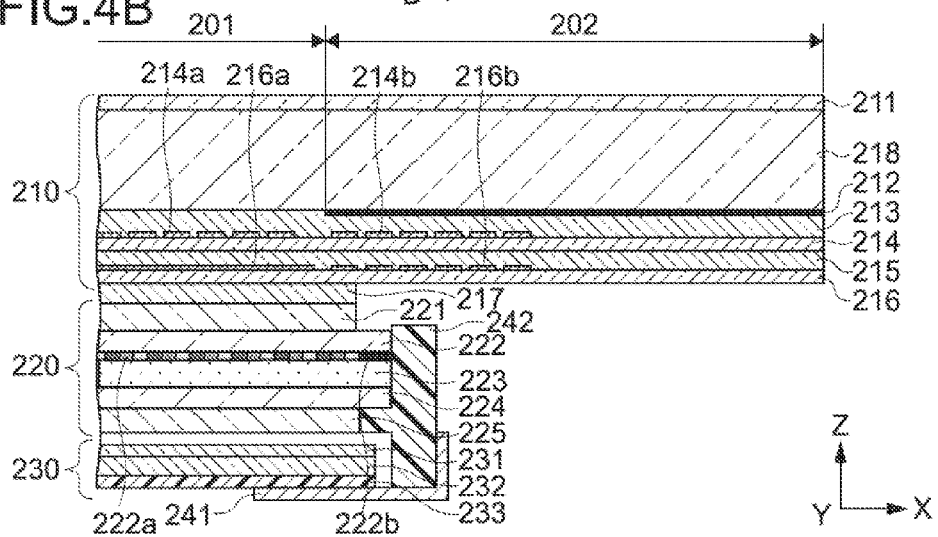
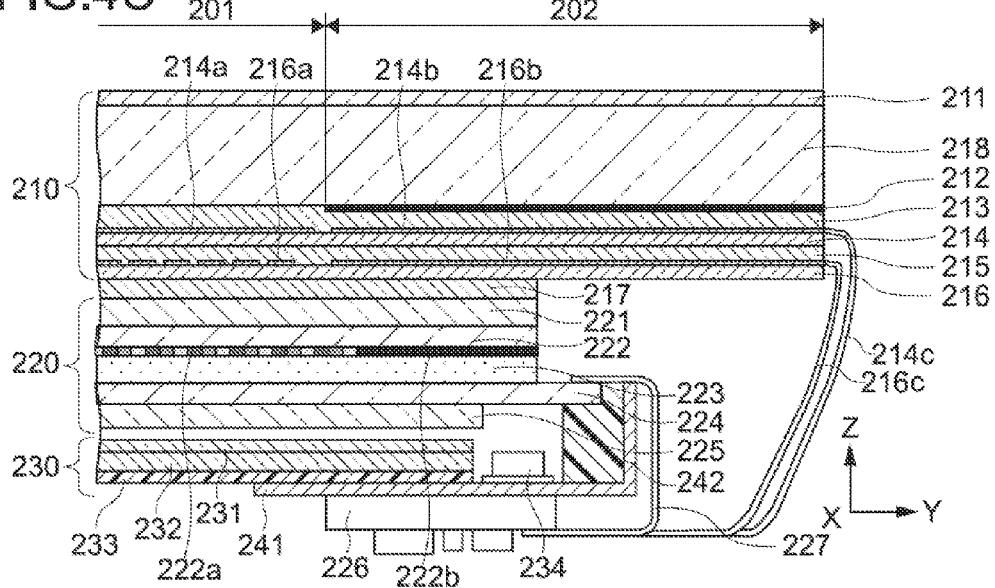

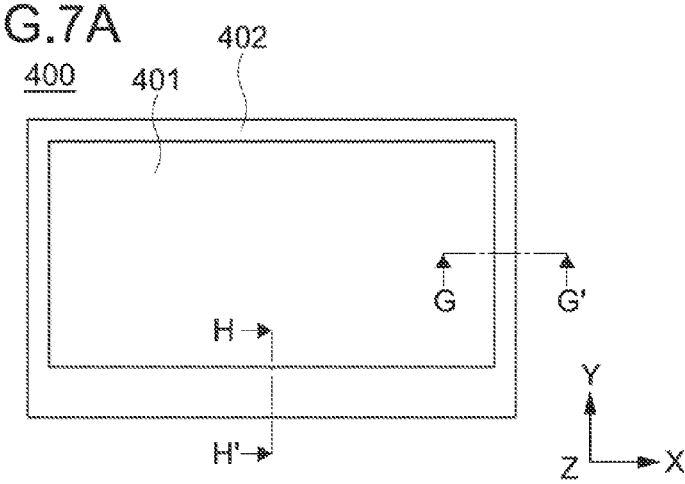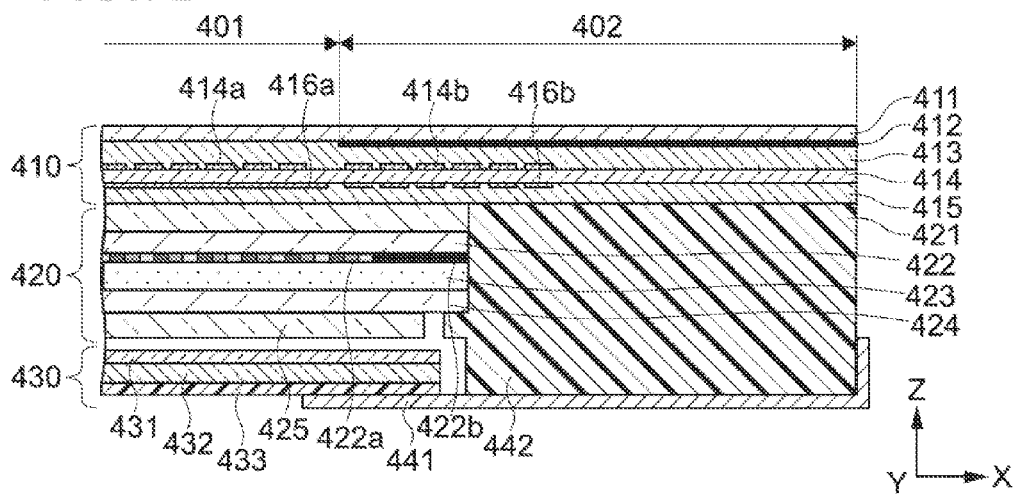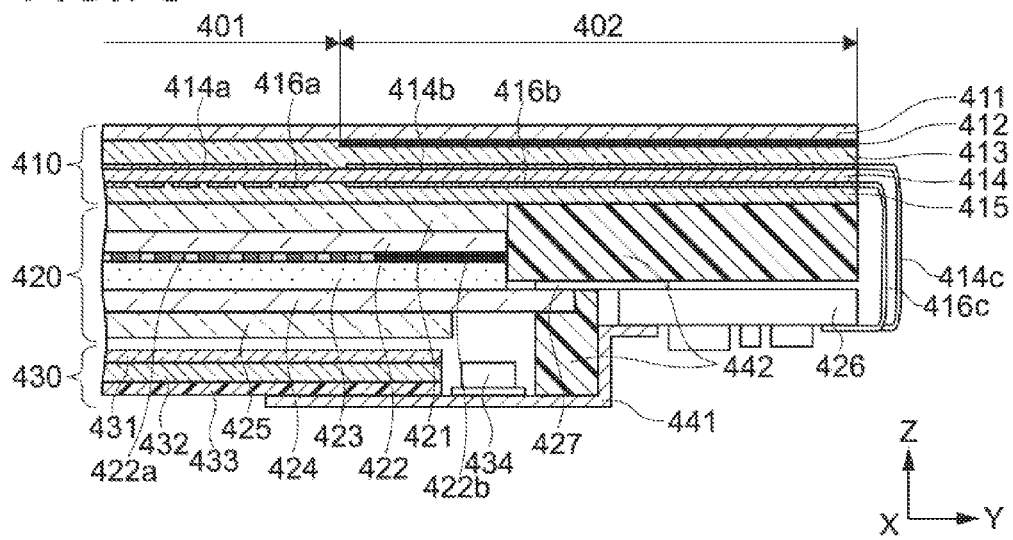

INFORMATION PROCESSING APPARATUS AND METHOD OF MANUFACTURING INFORMATION PROCESSING APPARATUS

CROSS-REFERENCE TO RELATED APPLICATION

The present application claims priority from Japanese Patent Application No. JP 2012-126594 filed in the Japanese Patent Office on Jun. 1, 2012, the entire content of which is incorporated herein by reference.

The present disclosure relates to an information processing apparatus including a touchscreen display, and a method of manufacturing the information processing apparatus.

Some information processing apparatuses such as personal computers include touchscreen displays. In general, a touchscreen display has the following structure. A touchscreen is layered on a display. A user operates the touchscreen while watching an image displayed on the display (for example, see Japanese Patent Application Laid-open No. 2008-176191.).

SUMMARY

It is desirable that a surface of a touchscreen display of an information processing apparatus, which is operated by a user, be high in strength. In view of this, in general, the top surface of a touchscreen display is a glass cover. However, if the top surface of a touchscreen display is a glass cover, the weight of the information processing apparatus is increased, and the thickness of the touchscreen display is increased.

In view of the above-mentioned circumstances, it is desirable to provide an information processing apparatus, which may be light in weight and small in size. Further, it is desirable to provide a method of manufacturing such an information processing apparatus.

According to an embodiment of the present technology, there is provided an information processing apparatus including a display unit and a touchscreen unit.

The display unit includes a display area, the display area being configured to display an image.

The touchscreen unit includes a facing area and an outer area, the facing area facing the display area, the outer area being outside of the facing area.

An area of the touchscreen unit is attached to the display unit, the area including the facing area and the outer area.

According to this structure, an information processing apparatus, which may be light in weight and small in size, may be provided.

The information processing apparatus may further include an exterior unit accommodating the display unit and the touchscreen unit such that the facing area and the outer area of the touchscreen unit are exposed.

The information processing apparatus may further include a backlight unit arranged at a surface of the display unit, the surface being opposite to a surface to which the touchscreen unit is attached.

The backlight unit may be arranged in an area, the area substantially facing the facing area of the touchscreen unit, and a control board may be arranged in at least a part of an area of a surface of the display unit, the surface being opposite to the surface to which the touchscreen unit is attached, the area excluding the area occupied by the backlight unit.

The control board may be arranged in an area substantially facing the outer area.

According to an embodiment of the present technology, there is provided a method of manufacturing an information processing apparatus.

The method includes: forming a display unit including a surface, the surface including a display area and a non-display area, the display area being configured to display an image, the non-display area being outside of the display area; and providing an electrode sheet on the surface of the display unit by means of roll lamination, a predetermined electrode pattern being formed on the electrode sheet, to thereby form a touchscreen unit on the surface of the display unit.

According to this structure, an information processing apparatus, which may be light in weight and small in size, may be manufactured at low cost by using the simple method.

As described above, according to the present technology, an information processing apparatus, which may be light in weight and small in size, may be provided. Further, a method of manufacturing such an information processing apparatus may be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4A is a plan view of a touchscreen display of a comparative example;

FIG. 4B is a sectional view of the C-C' line of the touchscreen display of FIG. 4A;

FIG. 4C is a sectional view of the D-D' line of the touchscreen display of FIG. 4A;

FIG. 7A is a plan view of a touchscreen display of an information processing apparatus according to a third embodiment of the present technology;

FIG. 7B is a sectional view of the G-G' line of the touchscreen display of FIG. 7A; and FIG. 7C is a sectional view of the H-H line of the touchscreen display of FIG. 7A.

DETAILED DESCRIPTION OF EMBODIMENTS

Hereinafter, embodiments of the present disclosure will be described with reference to the drawings.

First Embodiment

Entire Structure

Figure 1A:
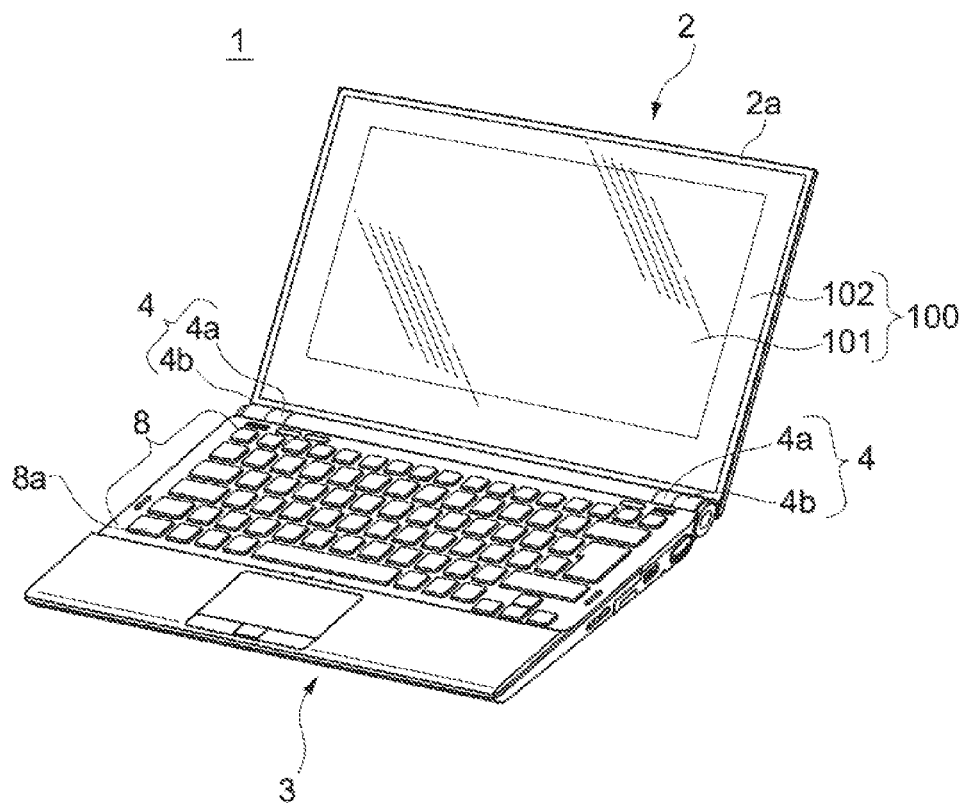
FIG. 1A is a perspective view showing an information processing apparatus according to a first embodiment of the present technology, in which the information processing apparatus is open.
Figure 1B:
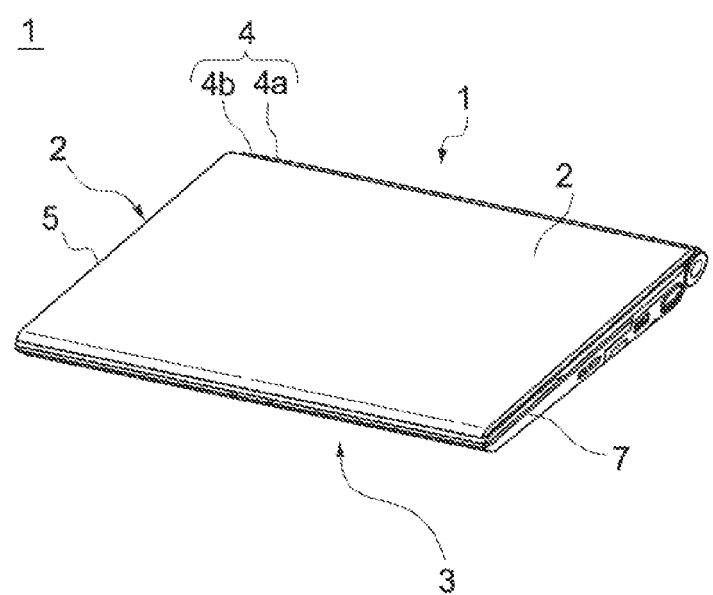
FIG. 1B is a perspective view showing the information processing apparatus of FIG. 1A, in which the information processing apparatus is closed.

FIG. 1A is a perspective view showing an information processing apparatus 1 according to a first embodiment of the present technology, in which the information processing apparatus 1 is open. FIG. 1B is a perspective view showing the information processing apparatus 1 of FIG. 1A, in which the information processing apparatus 1 is closed. The information processing apparatus 1 is a clamshell personal computer.

The information processing apparatus 1 includes a first exterior unit 2, a second exterior unit 3, and coupling units 4. The coupling units 4 couple the two exterior units 2 and 3. Each of the first exterior unit 2, the second exterior unit 3, and the coupling units 4 is made of a material, which is difficult to deform. Examples of such a material include, for example, metal materials such as aluminum, and resin materials such as reinforced plastic. The first exterior unit 2, the second exterior unit 3, and the coupling units 4 may be made of the same material or different materials.

The coupling unit 4 has a hinge structure. The first exterior unit 2 is capable of rotating with respect to the second exterior unit 3 via the coupling units 4. More specifically, the coupling unit 4 includes a cylindrical connection unit 4a and a cylindrical connection unit 4b. The cylindrical connection unit 4a is formed on the first exterior unit 2. The cylindrical connection unit 4b is formed on the second exterior unit 3. The cylindrical connection unit 4a fits the cylindrical connection unit 4b such that they are capable of rotating around the central axis. That is, the first exterior unit 2 rotates with respect to the second exterior unit 3, whereby the information processing apparatus 1 is open (FIG. 1A) and closed (FIG. 1B).

The information processing apparatus 1 includes a touchscreen display 100. The first exterior unit 2 accommodates the touchscreen display 100. The touchscreen display 100 includes a display area 101 and a non-display area 102. Images are displayed on the display area 101. The non-display area 102 is always black.

The display area 101 and the non-display area 102 of the touchscreen display 100 are exposed from the first exterior unit 2. A bezel unit 2a of the first exterior unit 2 holds the entire outer rim portion of the non-display area 102.

The information processing apparatus 1 includes a keyboard unit 8. The second exterior unit 3 accommodates the keyboard unit 8. The keyboard unit 8 includes a plurality of keys 8a. The keyboard unit 8 includes an operation area. In the operation area, the plurality of keys 8a are exposed from the second exterior unit 3.

When the information processing apparatus 1 is open as shown in FIG. 1A, the touchscreen display 100 is kept upright with respect to the keyboard unit 8. When the touchscreen display 100 is upright, a user is capable of operating the touchscreen display 100 and the keyboard unit 8 while watching the touchscreen display 100. The user operates the touchscreen display 100 with his finger or with an operating device such as a stylus. The user operates the keyboard unit 8 with his fingers.

The torque when the coupling units 4 rotate is set as follows. Even if a user operates and presses the touchscreen display 100, the first exterior unit 2 does not rotate with respect to the second exterior unit 3. In addition, a user is capable of opening/closing the information processing apparatus 1 smoothly.

When the information processing apparatus 1 is closed as shown in FIG. 1B, the touchscreen display 100 faces the keyboard unit 8. In other words, the first exterior unit 2 covers the touchscreen display 100, and the second exterior unit 3 covers the keyboard unit 8. A user carries or takes custody of the closed information processing apparatus 1. That is, when a user carries or takes custody of the information processing apparatus 1, the touchscreen display 100 or the keyboard unit 8 may not be damaged.

Structure of Touchscreen Display

Figure 2A:
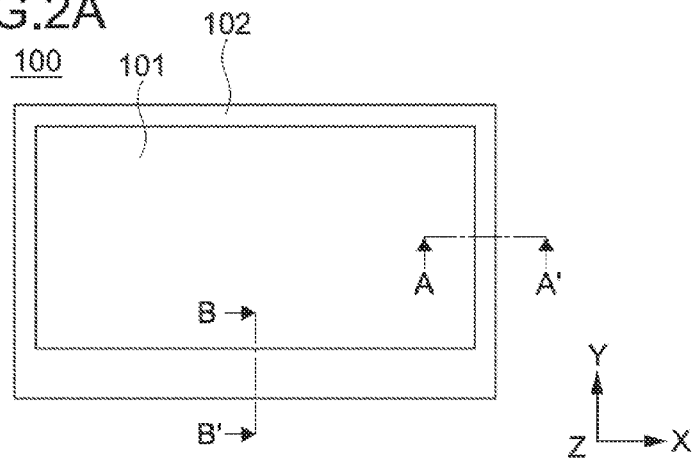
FIG. 2A is a plan view of a touchscreen display of the information processing apparatus of FIG. 1A.
Figure 2B:
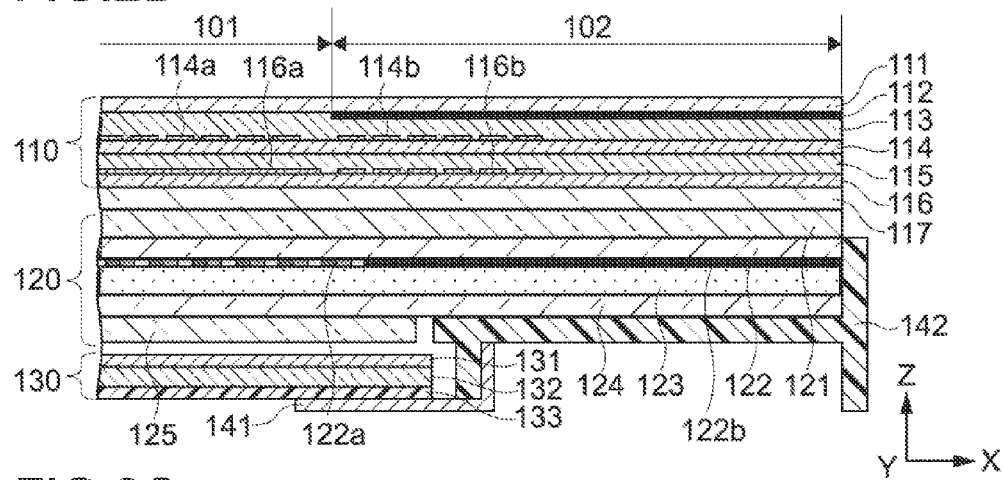
FIG. 2B is a sectional view of the A-A' line of the touchscreen display of FIG. 2A.
Figure 2C:
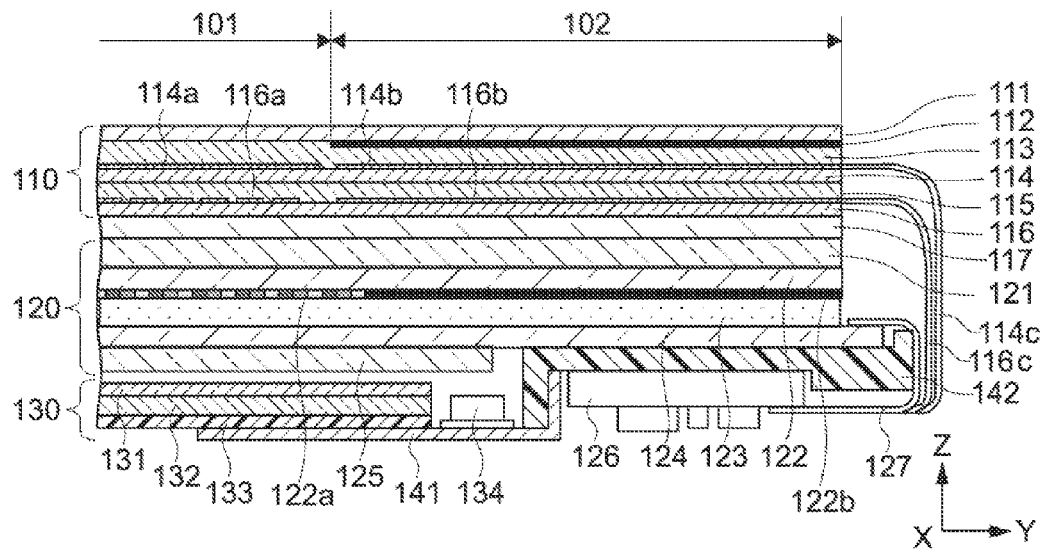
FIG. 2C is a sectional view of the B-B' line of the touchscreen display of FIG. 2A.

FIG. 2A is a plan view of the touchscreen display 100. FIG. 2B is a sectional view of the A-A' line of the touchscreen display 100 of FIG. 2A. FIG. 2C is a sectional view of the B-B' line of the touchscreen display 100 of FIG. 2A.

X axis, Y axis, and Z axis are shown in each of FIGS. 2A, 2B, and 2C. X axis, Y axis, and Z axis are orthogonal to each other. X axis, Y axis, and Z axis are common to FIGS. 2A, 2B, and 2C. Note that a user operates the touchscreen display 100 from the upper side in the Z axis direction.

In general, a touchscreen display is required to have a structure, with which a user is capable of swiping the touchscreen display comfortably. "Swipe" is an operation that a user slides his finger on a touchscreen display. The following is an example of swipe. When a user wishes to change a page of a document displayed on a display unit, the user slides his finger on the touchscreen display as if he actually turns a page of a book. As a result, the page of the document is changed.

In view of this, the touchscreen display 100 has the following structure. The non-display area 102 is provided outside of the display area 101. The non-display area 102 is exposed from the bezel unit 2a. The non-display area 102 is apart from the bezel unit 2a by a predetermined distance. The display area 101 is flush with the non-display area 102.

Because of this structure, when a user swipes the edge portion of the display area 101, the user is capable of moving his finger between the non-display area 102 and the display area 101 seamlessly. That is, when a user swipes the touchscreen, his finger does not touch the bezel unit. The user does not get a feeling of strangeness because his finger is not caught in the bezel unit. As a result, the user achieves an improved operational feeling. Note that the width of the bezel unit 2a of the first exterior unit 2 may be smaller. As a result, the distance between the non-display area 102 and the bezel is larger.

The touchscreen display 100 includes a touchscreen 110, a liquid crystal display panel 120, and a backlight unit 130. More specifically, the touchscreen display 100 has the following structure. The touchscreen 110, the liquid crystal display panel 120, and the backlight unit 130 are layered from the upper side in the Z axis direction.

The touchscreen 110 is a sensor unit. The sensor unit receives an operation from a user. The liquid crystal display panel 120 and the backlight unit 130 are arranged at the rear side of the touchscreen 110 in the Z axis direction. The liquid crystal display panel 120 and the backlight unit 130 function as a display unit. The display unit generates an image displayed on the display area 101.

The entire lower surface of the touchscreen 110 in the Z axis direction is attached on the entire upper surface of the liquid crystal display panel 120 in the Z axis direction by using a general-purpose transparent adhesive.

Further, a metal frame 141 and a resin frame 142 mounts the backlight unit 130 on the liquid crystal display panel 120. The metal frame 141 is made of a metal material such as aluminum, and has a predetermined shape. The resin frame 142 is made of a resin material such as plastic, and has a predetermined shape.

The touchscreen display 100 includes a control board 126. The control board 126 controls a touchscreen unit including the touchscreen 110, and the display unit including the liquid crystal display panel 120 and the backlight unit 130. The control board 126 is connected to a main board (not shown). Electronic components of the information processing apparatus 1 such as a CPU (Central Processing Unit) are mounted on the main board.

Structure of Touchscreen

The touchscreen 110 includes a first electrode sheet 116 and a second electrode sheet 114. The pattern of the first electrodes 116a is formed on the first electrode sheet 116. The pattern of the second electrodes 114a is formed on the second electrode sheet 114. A film-type transparent flexible sheet is used as a base material of each of the electrode sheets 116, 114.

The first electrodes 116a on the first electrode sheet 116 has the following structure. A plurality of stripe-shaped electrodes, which run in the X axis direction, are arrayed in the Y axis direction. Further, the second electrodes 114a on the second electrode sheet 114 has the following structure. A plurality of stripe-shaped electrodes, which run in the Y axis direction, are arrayed in the X axis direction. The first electrode sheet 116 and the second electrode sheet 114 structure a cross-matrix capacitative element.

A first extraction pattern 116b is extracted from the electrodes 116a. The first extraction pattern 116b is formed on an area on the first electrode sheet 116, which corresponds to the non-display area 102. Similarly, a second extraction pattern 114b is extracted from the electrodes 114a. The second extraction pattern 114b is formed on an area on the second electrode sheet 114, which corresponds to the non-display area 102.

The extraction pattern 116b is connected to the control board 126 via a flexible printed circuit board 116c. The extraction pattern 114b is connected to the control board 126 via a flexible printed circuit board 114c. Because of this, the capacitative element, which includes the first electrode sheet 116 and the second electrode sheet 114, is capable of sending/receiving signals to/from the control board 126.

Further, the touchscreen 110 includes a protective sheet 111. The protective sheet 111 is an uppermost layer, which receives operations by a user. The protective sheet 111 is structured as follows. A hard coating layer, a low-reflection layer, and an anti-glare layer are applied on a PET (Polyethylene terephthalate) base material. Any transparent material is used as a base material of the protective sheet 111 instead of PET.

A light-shielding layer 112 is formed on the rear side of an area of the protective sheet 111 in the Z axis direction, which corresponds to the non-display area 102. Because of this, the touchscreen display 100 has the following structure. A user is not capable of seeing the structure of the non-display area 102 below the protective sheet 111 in the Z axis direction. That is, the entire surface of the non-display area 102 looks black to a user.

An adhesive layer 115 bonds the first electrode sheet 116 and the second electrode sheet 114. An adhesive layer 113 bonds the second electrode sheet 114 and the protective sheet 111. A general-purpose transparent adhesive may be used as the adhesive layer 115 or 113.

In general, a cover glass is attached on the uppermost surface of a touchscreen. Because of this, the touchscreen may be handled alone, and the surface strength of the touchscreen may be increased. Meanwhile, as described above, the touchscreen 110 of this embodiment includes no cover glass. The touchscreen 110 of this embodiment includes the first electrode sheet 116, the second electrode sheet 114, and the protective sheet 111. The first electrode sheet 116, the second electrode sheet 114, and the protective sheet 111 are flexible sheets.

Because of this, the touchscreen 110 is thinner and lighter in weight than a general touchscreen. However, the touchscreen 110 is flexible, and it is difficult to handle the touchscreen 110 alone. Because of this, the touchscreen 110 is not handled alone. The touchscreen 110 is manufactured by a below-described method.

Structure of Liquid Crystal Display Panel

The liquid crystal display panel 120 includes a liquid crystal glass cell. The liquid crystal glass cell includes a color filter board 122, a drive board 124, and a liquid crystal layer 123. The drive board 124 faces the color filter board 122 in the Z axis direction, and is below the color filter board 122. The liquid crystal layer 123 is sandwiched between the color filter board 122 and the drive board 124. A polarization sheet 121 is provided on the upper surface of the color filter board 122 in the Z axis direction.

A polarization sheet 125 is provided on the lower surface of the drive board 124 in the Z axis direction. The polarizing axis of the polarization sheet 121 is orthogonal to the polarizing axis of the polarization sheet 125.

A glass is used as a base material of each of the color filter board 122 and the drive board 124. Alternatively, any material having a predetermined transparency and a predetermined mechanical strength may be used. Examples of such a base material include, for example, acrylic and polycarbonate.

A color filter layer 122a is formed on an area of the lower surface of the color filter board 122 in the Z axis direction. The area is slightly larger than the area corresponding to the display area 101. The color filter layer 122a includes red color filters, green color filters, blue color filters, and black color filters. The red color filters, the green color filters, the blue color filters, and the black color filters are arrayed at a predetermined pattern. A light-shielding layer 122b is formed on an area of the lower surface of the color filter board 122 in the Z axis direction. The area is outside of the color filter layer 122a.

The drive board 124 includes TFTs (Thin Film Transistors). A TFT is arranged for each pixel of the liquid crystal glass cell. The drive board 124 changes orientation of the liquid crystal layer 123 depending on the driving status of each TFT. The intensity of light, which transmits the polarization sheet 121, out of the light, which has transmitted the polarization sheet 125, depends on the orientation of the liquid crystal layer 123.

The liquid crystal display panel 120 includes two boards 122, 124 each having a predetermined mechanical strength. Because of this, the liquid crystal display panel 120 alone has a predetermined mechanical strength. As described above, the upper surface of the liquid crystal display panel 120 in the Z axis direction is bonded to the entire lower surface of the touchscreen 110 in the Z axis direction. Because of this, the liquid crystal display panel 120 fixes the entire lower surface of the flexible touchscreen 110 in the Z axis direction. As a result, the plate-like shape of the touchscreen 110 is maintained.

Structure of Backlight Unit and Control Board

The backlight unit 130 includes an optical prism sheet 132, an optical diffusion sheet 131, a reflection sheet 133, and an LED (Light-Emitting Diode) unit 134. The optical diffusion sheet 131 is provided on the upper surface of the optical prism sheet 132 in the Z axis direction. The reflection sheet 133 is provided on the lower surface of the optical prism sheet 132 in the Z axis direction. The LED (Light-Emitting Diode) unit 134 is adjacent to the optical prism sheet 132 in the Y axis direction.

The LED unit 134 includes a plurality of LEDs in the X axis direction. The LED unit 134 emits light to the optical prism sheet 132. Light enters the optical prism sheet 132, and the light is superimposed in the optical prism sheet 132, whereby the light is homogenized. In addition, the light is reflected by the reflection sheet 133, transmits the optical diffusion sheet 131, and enters the liquid crystal display panel 120.

The optical prism sheet 132 is provided on an area slightly larger than an area of the backlight unit 130, which corresponds to the display area 101. As a result, the backlight unit 130 is capable of positively emitting light in the area corresponding to the display area 101. The liquid crystal display panel 120 is provided on the entire area including the display area 101 and the non-display area 102. Because of this, space is provided at a position, which is adjacent to the backlight unit 130 in the X axis direction and the Y axis direction.

The control board 126 is mounted at a position, which is adjacent to the backlight unit 130 in the Y axis direction. More specifically, the control board 126 is attached to a position of the rear side of the liquid crystal display panel 120 in the Z axis direction. The position corresponds to the non-display area 102, and the backlight unit 130 is not arranged at the position. The control board 126 is attached via the resin frame 142.

The control board 126 is inside the non-display area 102 in the X axis direction and the Y axis direction. The uppermost surface of the control board 126 is upper than the uppermost surface of the backlight unit 130 in the Z axis direction. As described above, the touchscreen display 100 of this embodiment has the following structure. The control board 126 is arranged in the space adjacent to the backlight unit 130. As a result, the entire touchscreen display 100 may be downsized.

According to this embodiment, the control board 126 is configured to control all the touchscreen 110, the liquid crystal display panel 120, and the backlight unit 130. Alternatively, each of the touchscreen 110, the liquid crystal display panel 120, and the backlight unit 130 may have an independent control unit. In this case, the control units may be provided in addition to the control board 126. The control units may be provided in a space of FIG. 2B, which is adjacent to the backlight unit 130 in the X axis direction.

Method of Manufacturing Touchscreen Display

Figure 3:
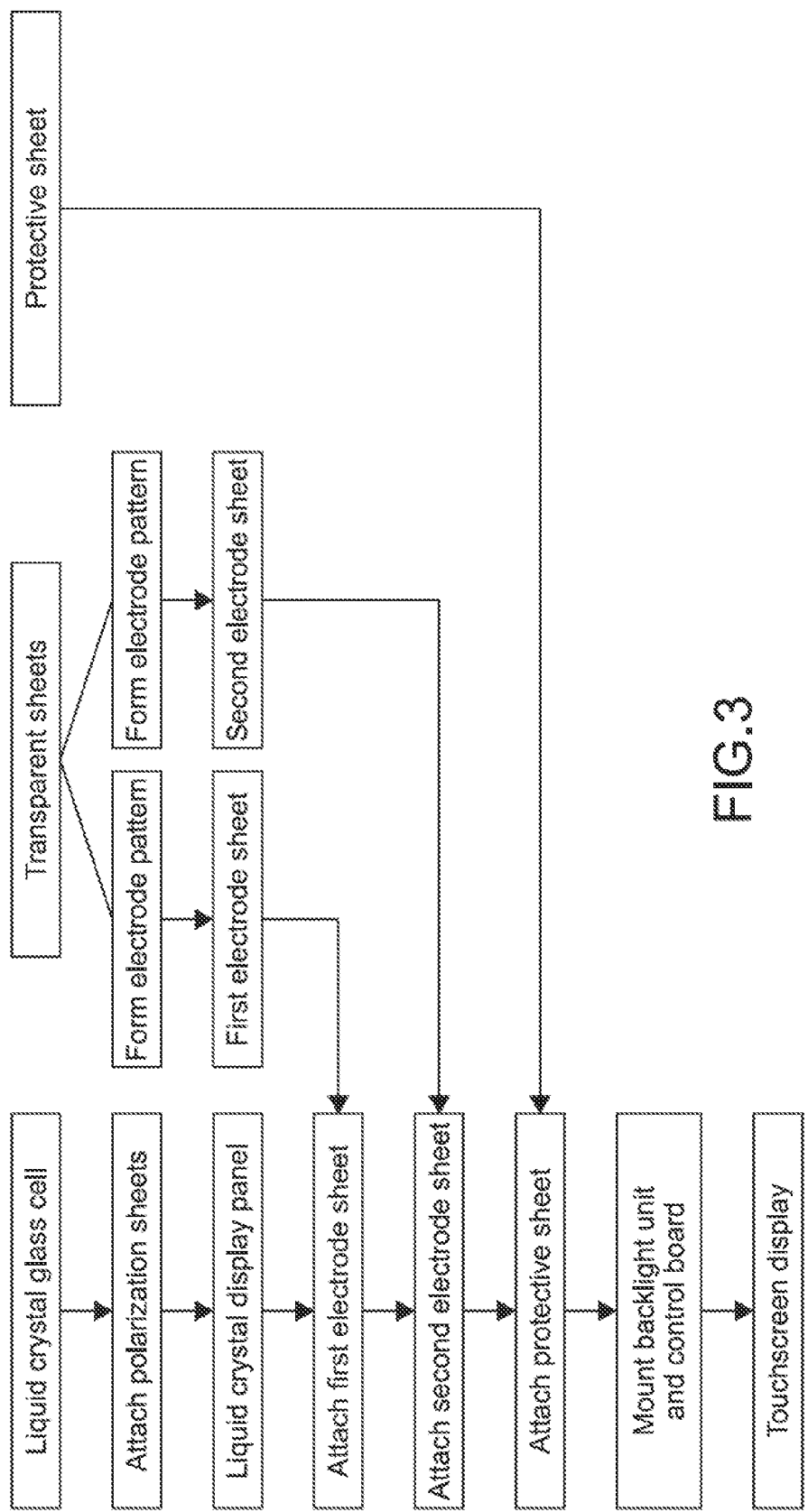
FIG. 3 is a flowchart schematically showing a method of manufacturing the touchscreen display of FIG. 2A to FIG. 2C.

FIG. 3 is a flowchart schematically showing a method of manufacturing the touchscreen display 100. According to the method of manufacturing the touchscreen display 100, roll lamination is positively used. The roll lamination is known as a low-cost and easy process. Because of this, the touchscreen display 100 may be manufactured at low cost.

In the roll lamination, a roll sheet is used. The roll sheet is a roll of sheet to be bonded. First, a sheet is pulled out of a roll sheet, and the sheet covers a to-be-bonded surface. Then, squeegee process is performed such that the sheet closely attaches the to-be-bonded surface. The sheet is cut, and the sheet has the size of the to-be-bonded surface. Note that, if the sheet is not adhesive, an adhesive layer is provided between the sheet and the to-be-bonded surface.

According to this embodiment, first, the polarization sheets 121, 125 are attached to the both surfaces of the liquid crystal glass cell by means of roll lamination. The liquid crystal glass cell includes the color filter board 122, the liquid crystal layer 123, and the drive board 124. As a result, the liquid crystal display panel 120 is manufactured.

The pattern of the first electrodes 116a is formed on a transparent sheet, whereby the first electrode sheet 116 is manufactured. The pattern of the second electrodes 114a is formed on a transparent sheet, whereby the second electrode sheet 114 is manufactured. The first electrode sheet 116 is attached to the liquid crystal display panel 120 via an adhesive layer 117 by means of roll lamination. Then, the second electrode sheet 114 is attached to the first electrode sheet 116 via the adhesive layer 115 by means of roll lamination.

Further, the protective sheet 111 is attached to the second electrode sheet 114 via the adhesive layer 113 by means of roll lamination. Note that the light-shielding layer 112 is previously formed on the protective sheet 111.

As described above, the touchscreen 110 is formed on the upper surface of the liquid crystal display panel 120 in the Z axis direction. According to the method of this embodiment, the flexible touchscreen 110 may be formed on the liquid crystal display panel 120, while the flexible touchscreen 110 is not handled alone and the form of the touchscreen 110 is constant.

Next, the backlight unit 130 and the control board 126 are mounted on the liquid crystal display panel 120 by using the metal frame 141 and the resin frame 142. Then, flexible printed circuit boards 127, 116c, 114c are attached. Note that the backlight unit 130, the control board 126, and the flexible printed circuit boards 127, 116c, 114c may be mounted before manufacturing the touchscreen 110.

Comparative Example

FIG. 4A is a plan view showing a touchscreen display 200 according to a comparative example of this embodiment. FIG. 4B is a sectional view of the C-C' line of the touchscreen display 200 of FIG. 4A. FIG. 4C is a sectional view of the D-D' line of the touchscreen display 200 of FIG. 4A. The touchscreen display 200 has the structure similar to the structure of the touchscreen display 100 of this embodiment except for the following structure.

A touchscreen 210 and a liquid crystal display panel 220 are individually manufactured. After that, the touchscreen 210 is attached to the liquid crystal display panel 220 via an adhesive layer 217. As a result, the touchscreen display 200 is manufactured. The touchscreen 210 is formed as a single element. Because of this, the touchscreen 210 as a single element is required to have a higher mechanical strength. In view of this, a cover glass 218 is provided between a protective sheet 211 and a second electrode sheet 214. As a result, even if the touchscreen 210 is handled alone, the form of the touchscreen 210 is constant.

Note that, in the touchscreen display 200, a light-shielding layer 212 of a non-display area 202 is provided not on the protective sheet 211 but on the lower surface of the cover glass 218 in the Z axis direction.

Because the cover glass 218 is heavy, the touchscreen 210 is likely to bend. The touchscreen 210 generates signals. When the touchscreen 210 bends, the signals are likely to include noise.

The larger the area of the touchscreen display 200 in the XY plane, the more the touchscreen 210 bends. Specifically, if the touchscreen display 200 is applied to a clamshell personal computer, the touchscreen 210 is likely to bend. This is because the size of the touchscreen display 200 is equal to or more than 10 inches.

In view of this, the adhesive layer 217 is required to have high stiffness in order that the touchscreen 210 does not bend. The touchscreen 210 is attached to the liquid crystal display panel 220 via the adhesive layer 217.

The touchscreen 210 may be attached to the liquid crystal display panel 220 by means of UV curing adhesion using UV (ultraviolet) resin or by means of vacuum bonding using an optical adhesive sheet. As a result, the adhesive layer 217 having high stiffness is manufactured. However, each of both methods is a special adhesion method, which requires time and cost.

Meanwhile, the touchscreen 110 of this embodiment includes no heavy component such as a cover glass. Because of this, the adhesive layer 117 is not required to have high stiffness. The touchscreen 110 is attached to the liquid crystal display panel 120 via the adhesive layer 117. Because of this, the touchscreen 110 may be easily attached to the liquid crystal display panel 120 at low cost by using a general method.

Note that, in the touchscreen display 200, the form of the touchscreen 210 may be constant because of the cover glass 218. Because of this, the liquid crystal display panel 220 is not formed in an area below the non-display area 202 in the Z axis direction of the touchscreen 210.

Meanwhile, according to the touchscreen display 100 of this embodiment, the liquid crystal display panel 120 is formed in the entire display area 101 and the entire non-display area 102. Because of this, the liquid crystal display panel 120 of the touchscreen display 100 is relatively larger than the liquid crystal display panel 220 of the touchscreen display 200.

The weight of the touchscreen display 100 is increased because the liquid crystal display panel 120 is larger. However, the weight of the touchscreen display 100 is decreased because a cover glass is not provided. The decrease in weight is larger than the increase in weight. Because of this, the touchscreen display 100 is relatively lighter in weight than the touchscreen display 200.

If a touchscreen display is applied to a clamshell information processing apparatus and is used, a touchscreen display is upright as shown in FIG. 1A. Because of this, if a touchscreen display is heavy, especially when a first exterior unit, which accommodates the touchscreen display, is reclined behind the rear surface of a second exterior unit, the first exterior unit may fall toward the rear surface side.

Further, if a touchscreen display is heavy, the coupling units 4 are likely to rotate because of the weight of the touchscreen display. In view of this, the torque of the coupling units 4 should be large in order that the coupling units 4 are not likely to rotate. As a result, it is difficult for a user to open/close the information processing apparatus.

As described above, a touchscreen display light in weight is effective especially in a case where the touchscreen display is used in a clamshell information processing apparatus.

Further, according to the touchscreen display 200 of the comparative example, a control board 226 is arranged below a backlight unit 230 in the Z axis direction. As a result, because the control board 226 is provided, the thickness of the touchscreen display 200 is increased by the height of the control board 226 in the Z axis direction.

Meanwhile, according to the touchscreen display 100 of this embodiment, as described above, the control board 126 is arranged in the space adjacent to the backlight unit 130. As a result, the thickness of the touchscreen display 100 may be smaller than the thickness of the touchscreen display 200.

Figure 5:
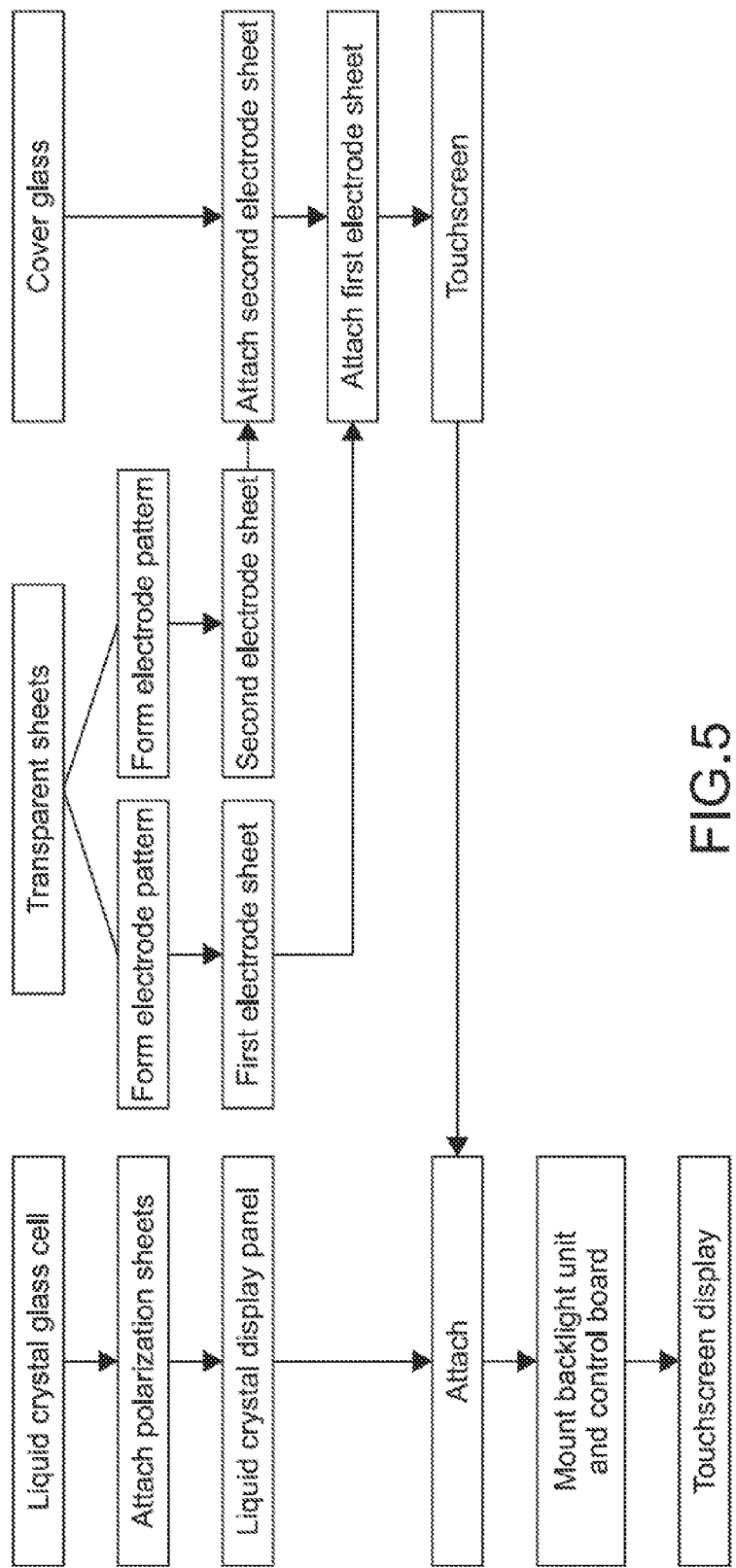
FIG. 5 is a flowchart schematically showing a method of manufacturing the touchscreen display of FIG. 4A to FIG. 4C.

FIG. 5 is a flowchart showing a method of manufacturing the touchscreen display 200 according to the comparative example.

First, polarization sheets 221, 225 are attached to both surfaces of a liquid crystal glass cell by means of roll lamination. The liquid crystal glass cell includes a color filter board 222, a liquid crystal layer 223, and a drive board 224. As a result, the liquid crystal display panel 220 is manufactured.

The pattern of the first electrodes 216a is formed on a transparent sheet, whereby the first electrode sheet 216 is manufactured. The pattern of the second electrodes 214a is formed on a transparent sheet, whereby the second electrode sheet 214 is manufactured.

The protective sheet 211 and the light-shielding layer 212 are previously formed on the cover glass 218. The second electrode sheet 214 is attached to the cover glass 218 via an adhesive layer 213 by means of roll lamination. Then, the first electrode sheet 216 is attached to the second electrode sheet 214 via an adhesive layer 215 by means of roll lamination.

As described above, the touchscreen 210 of the touchscreen display 200 is manufactured as a single element. This is different from the touchscreen 110 of this embodiment.

Then, the touchscreen 210 is attached to the liquid crystal display panel 220 by means of the above-mentioned UV curing adhesion using UV resin or by means of the above-mentioned vacuum bonding using an optical adhesive sheet.

Next, the backlight unit 230 and the control board 226 are mounted on the liquid crystal display panel 220 by using a metal frame 241 and a resin frame 242. Then, flexible printed circuit boards 227, 216c, 214c are attached.

Second Embodiment

Figure 6A:
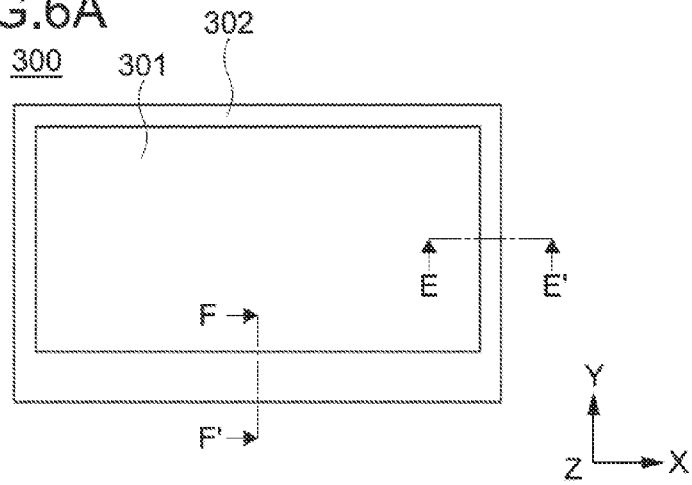
FIG. 6A is a plan view of a touchscreen display of an information processing apparatus according to a second embodiment of the present technology.
Figure 6B:
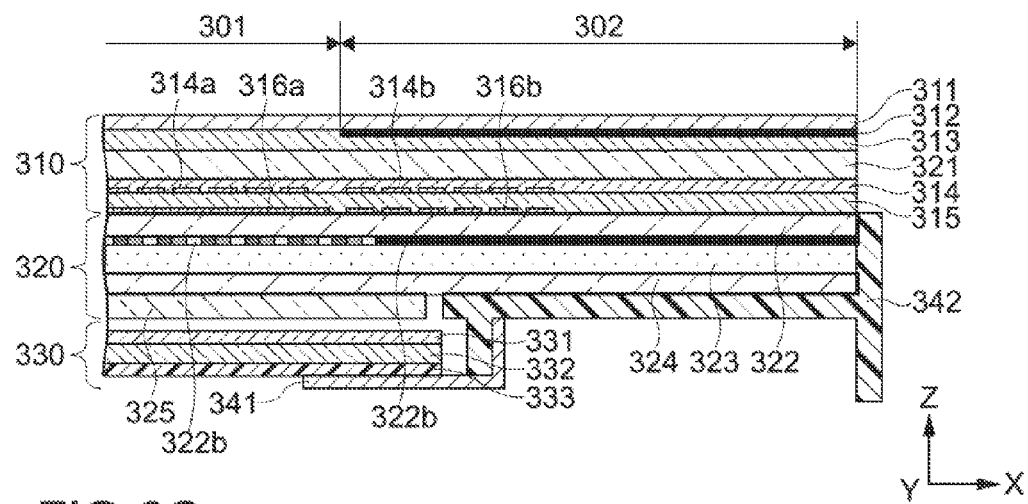
FIG. 6B is a sectional view of the E-E' line of the touchscreen display of FIG. 6A.
Figure 6C:
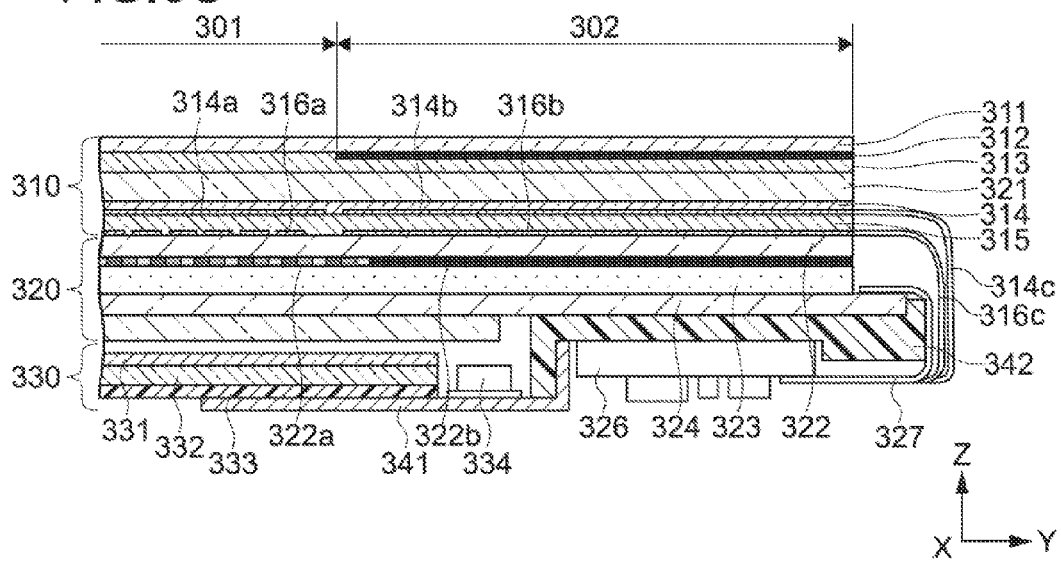
FIG. 6C is a sectional view of the F-F' line of the touchscreen display of FIG. 6A.

FIG. 6A is a plan view showing a touchscreen display 300 according to a second embodiment of the present technology. FIG. 6B is a sectional view of the E-E' line of the touchscreen display 300 of FIG. 6A. FIG. 6C is a sectional view of the F-F' line of the touchscreen display 300 of FIG. 6A. The touchscreen display 300 has the structure similar to the structure of the touchscreen display 100 of this embodiment except for the following structure.

In the touchscreen display 300, first electrodes 316a and a first extraction pattern 316b are directly formed on the upper surface of a color filter board 322 of a liquid crystal glass cell in the Z axis direction. Further, a protective sheet 315 is formed on the upper surface of the color filter board 322 in the Z axis direction. The protective sheet 315 covers the first electrodes 316a and the first extraction pattern 316b. Second electrodes 314a and a second extraction pattern 314b are formed on the upper surface of the protective sheet 315 in the Z axis direction.

Further, a protective sheet 314 is formed on the upper surface of the protective sheet 315 in the Z axis direction. The protective sheet 314 covers the second electrodes 314a and the second extraction pattern 314b. A polarization sheet 321 is formed on the upper surface of the protective sheet 314 in the Z axis direction.

As described above, the on-cell first electrodes 316a of a touchscreen 310 may be formed. In this case, a liquid crystal display panel 320 includes a liquid crystal glass cell and polarization sheets 325, 321. The liquid crystal glass cell includes the color filter board 322, a liquid crystal layer 323, and a drive board 324. As described above, the electrodes 316a, 314a of the touchscreen 310 may be formed on the upper surface of the liquid crystal glass cell of the liquid crystal display panel 320 in the Z axis direction.

Note that, according to this embodiment, the on-cell electrodes are formed on the upper surface of the liquid crystal glass cell in the Z axis direction. Alternatively, a first electrode sheet and a second electrode sheet may be attached to the upper surface of the liquid crystal glass cell in the Z axis direction by means of roll lamination similar to the first embodiment. In this case, a polarization sheet of the liquid crystal display panel may be attached to the upper surface of the second electrode sheet in the Z axis direction by means of roll lamination.

Third Embodiment

FIG. 7A is a plan view showing a touchscreen display 400 according to a third embodiment of the present technology. FIG. 7B is a sectional view of the G-G' line of the touchscreen display 400 of FIG. 7A. FIG. 7C is a sectional view of the H-H' line of the touchscreen display 400 of FIG. 7A. The touchscreen display 400 has the structure similar to the structure of the touchscreen display 100 of this embodiment except for the following structure.

In the touchscreen display 400, a liquid crystal display panel 420 is provided below a display area 401 and an area slightly outside of the display area 401. In other words, the liquid crystal display panel 420 is provided below the display area 401 and a part of a non-display area 402. More specifically, in the touchscreen display 400, the liquid crystal display panel 420 does not fix the most part of the lower surface of a touchscreen 410 in the Z axis direction in the non-display area 402. This is different from the touchscreen display 100 of the first embodiment.

Alternatively, the touchscreen display 400 is structured as follows. A resin frame 442 as a fixing unit fixes an area of the lower surface of the touchscreen 410 in the Z axis direction. The area is not fixed on the liquid crystal display panel 420. In this manner, one of the liquid crystal display panel 420 and the resin frame 442 fixes a part of the lower surface of the touchscreen 410 in the Z axis direction. The other fixes the other part of the lower surface of the touchscreen 410. In other words, the liquid crystal display panel 420 and the resin frame 442 fix the entire lower surface of the touchscreen 410. As a result, the touchscreen 410 is held flat.

Further, the touchscreen 110 of the first embodiment includes the two electrode sheets. However, the touchscreen 410 of this embodiment includes one electrode sheet 414. A first electrode pattern 416*a* and a first extraction pattern 416*b* are formed on the lower surface of the electrode sheet 414 in the Z axis direction. A second electrode pattern 414*a* and a second extraction pattern 414*b* are formed on the upper surface of the electrode sheet 414 in the Z axis direction.

The number of electrode sheets is not two but one. As a result, the number of components is reduced, and the manufacturing process is simple. As a result, the cost of the touchscreen display 400 may be decreased.

The embodiments of the present technology have been described above. The present technology is not limited to the above-mentioned embodiments. As a matter of course, various changes may be made within the gist of the present technology.

For example, according to the embodiments of the present technology, a liquid crystal display including a liquid crystal display panel and a backlight unit is described as an example of a display unit. The display unit may be another general-purpose display unit. Note that the display unit may be of a thin type. Examples of such a display unit include, for example, a plasma display, an organic EL (electro luminescence) display, and an inorganic EL display.

Note that the present technology may employ the following structures.

(1) An information processing apparatus, comprising:
a display unit including a display area, the display area being configured to display an image; and
a touchscreen unit including a facing area and an outer area, the facing area facing the display area, the outer area being outside of the facing area, wherein
an area of the touchscreen unit is attached to the display unit, the area including the facing area and the outer area.

(2) The information processing apparatus according to (1), further comprising:
an exterior unit accommodating the display unit and the touchscreen unit such that the facing area and the outer area of the touchscreen unit is exposed.

(3) The information processing apparatus according to (2), further comprising:
a backlight unit arranged at a surface of the display unit, the surface being opposite to a surface to which the touchscreen unit is attached.

(4) The information processing apparatus according to (3), wherein
the backlight unit is arranged in an area, the area substantially facing the facing area of the touchscreen unit, and
a control board is arranged in at least a part of an area of a surface of the display unit, the surface being opposite to the surface to which the touchscreen unit is attached, the area excluding the area occupied by the backlight unit.

(5) The information processing apparatus according to (4), wherein
the control board is arranged in an area substantially facing the outer area.

(6) A method of manufacturing an information processing apparatus, comprising:
forming a display unit including a surface, the surface including a display area and a non-display area, the display area being configured to display an image, the non-display area being outside of the display area; and
providing an electrode sheet on the surface of the display unit by means of roll lamination, a predetermined electrode pattern being formed on the electrode sheet, to thereby form a touchscreen unit on the surface of the display unit.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display unit including a display area, the display area being configured to display an image, wherein the display unit includes two boards, each having a predetermined transparency and a predetermined mechanical strength to provide mechanical strength to a liquid crystal display panel of the display unit; and
a touchscreen unit including a facing area and an outer area, the facing area facing the display area, the outer area being outside of the facing area,
wherein an area of the touchscreen unit is attached to the display unit, the area attached to the display unit including the facing area and the outer area.

2. The information processing apparatus according to claim 1, further comprising:

an exterior unit accommodating the display unit and the touchscreen unit such that the facing area and the outer area of the touchscreen unit are exposed.

3. The information processing apparatus according to claim 2, further comprising:
   a backlight unit arranged at a first surface of the display unit, the first surface being opposite to a second surface to which the touchscreen unit is attached.

4. The information processing apparatus according to claim 3, wherein the backlight unit is arranged in a first area, the first area substantially facing the facing area of the touchscreen unit, and
   a control board is arranged in at least a part of a second area of the first surface of the display unit, the second area excluding the first area occupied by the backlight unit.

5. The information processing apparatus according to claim 4, wherein the control board is arranged in the second area substantially facing the outer area.

6. A method of manufacturing an information processing apparatus, comprising:
   forming a display unit including a surface, the surface including a display area and a non-display area, the display area being configured to display an image, the non-display area being outside of the display area, wherein the display unit includes two boards, each having a predetermined transparency and a predetermined mechanical strength to provide mechanical strength to a liquid crystal display panel of the display unit; and
   providing an electrode sheet on the surface of the display unit by means of roll lamination, a predetermined electrode pattern being formed on the electrode sheet, to thereby form a touchscreen unit on the surface of the display unit,
   wherein an area of the touchscreen unit is attached to the display unit, the area attached to the display unit including a facing area facing the display area and an outer area outside the facing area.

7. The information processing apparatus according to claim 1, wherein a light shielding layer of the touch screen unit overlaps a portion of the display area of the display unit.

* * * * *